United States Patent
Yamazaki et al.

(10) Patent No.: US 12,031,049 B2
(45) Date of Patent: Jul. 9, 2024

(54) AQUEOUS COATING MATERIAL COMPOSITION

(71) Applicant: KANSAI PAINT CO., LTD., Hyogo (JP)

(72) Inventors: Mika Yamazaki, Kanagawa (JP); Kazuaki Keicho, Kanagawa (JP); Shingo Amaki, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 548 days.

(21) Appl. No.: 17/413,666

(22) PCT Filed: Dec. 25, 2019

(86) PCT No.: PCT/JP2019/051041
§ 371 (c)(1),
(2) Date: Jun. 14, 2021

(87) PCT Pub. No.: WO2020/145171
PCT Pub. Date: Jul. 16, 2020

(65) Prior Publication Data
US 2022/0056301 A1 Feb. 24, 2022

(30) Foreign Application Priority Data
Jan. 8, 2019 (JP) .................................. 2019-000925

(51) Int. Cl.
| | | |
|---|---|---|
| *C08K 5/02* | (2006.01) | |
| *B65D 25/14* | (2006.01) | |
| *C08K 5/20* | (2006.01) | |
| *C09D 5/08* | (2006.01) | |
| *C09D 123/10* | (2006.01) | |
| *C09D 167/02* | (2006.01) | |

(52) U.S. Cl.
CPC ........... *C09D 123/10* (2013.01); *B65D 25/14* (2013.01); *C08K 5/20* (2013.01); *C09D 5/08* (2013.01); *C09D 167/02* (2013.01)

(58) Field of Classification Search
CPC ........ C09D 12/10; C09D 5/08; C09D 167/02; C09D 5/02; C09D 7/63; C09D 123/14; C09D 167/00; C09D 123/10; B65D 25/14; C08K 5/20; C08K 5/29; C08K 5/25; C08L 23/00; C08L 67/00; C08L 2201/54; C08L 2312/00; C08L 51/06; C08L 23/0869
USPC ....................................................... 524/502
See application file for complete search history.

(56) References Cited

U.S. PATENT DOCUMENTS

| | | | |
|---|---|---|---|
| 2002/0061959 A1* | 5/2002 | Kajimaru | ............. C09D 167/00 524/601 |
| 2010/0143628 A1 | 6/2010 | Choudhery et al. | |
| 2013/0149453 A1 | 6/2013 | Romick et al. | |
| 2014/0141268 A1 | 5/2014 | Wilbur et al. | |
| 2015/0056376 A1* | 2/2015 | Ishikura | ................... C09D 5/02 427/407.1 |
| 2020/0062992 A1 | 2/2020 | Kashiwakura et al. | |

FOREIGN PATENT DOCUMENTS

| | | |
|---|---|---|
| CN | 104822758 A | 8/2015 |
| CN | 105073921 A | 11/2015 |
| EP | 1 186 643 A1 | 3/2002 |
| JP | 2005-120306 A | 5/2005 |
| JP | 2005-179491 A | 7/2005 |
| JP | 2015-229710 A | 12/2015 |
| JP | 2016-501291 A | 1/2016 |
| JP | 2016-113561 A | 6/2016 |
| JP | 2016-148006 A | 8/2016 |
| WO | 2014/081838 A1 | 5/2014 |
| WO | 2014/081841 A1 | 5/2014 |
| WO | 2015/069502 A1 | 5/2015 |
| WO | 2018/207891 A1 | 11/2018 |

OTHER PUBLICATIONS

International Search Report (PCT/ISA/210) issued Mar. 31, 2020 by the International Searching Authority in International Patent Application No. PCT/JP2019/051041.
Written Opinion (PCT/ISA/237) issued Mar. 31, 2020 by the International Searching Authority in International Patent Application No. PCT/JP2019/051041.
Communication dated Oct. 31, 2023 issued by the Japanese Intellectual Property Office in counterpart Japanese Application No. 2020-565710.
Communication dated Nov. 3, 2021 issued by the State Intellectual Property Office of P.R. China in counterpart Chinese Application No. 201980088174.9.
Communication dated Sep. 14, 2022 issued by the European Patent Office in counterpart European Application No. 19908753.7.

* cited by examiner

*Primary Examiner* — Hannah J Pak
(74) *Attorney, Agent, or Firm* — Sughrue Mion, PLLC

(57) ABSTRACT

An aqueous coating material composition, includes: a polyolefin resin aqueous dispersion (A) containing a polypropylene (a1); a crosslinking agent (B) having a functional group that reacts with a carboxyl group; and a polyester resin aqueous dispersion (C) having a resin acid value of 3 mgKOHg to 100 mgKOH/g, and with respect to a total solid content of the polyolefin resin aqueous dispersion (A), a solid content of the crosslinking agent (B) is 0.1 mass % to 20 mass %, and a solid content of the polyester resin aqueous dispersion (C) is 0.5 mass % to 30 mass %.

4 Claims, No Drawings

AQUEOUS COATING MATERIAL COMPOSITION

CROSS-REFERENCE TO RELATED APPLICATIONS

This application is a National Phase Entry of PCT International Application No. PCT/JP2019/051041, filed on Dec. 25, 2019, which claims priority to Japanese Patent Application No. 2019-000925 filed on Jan. 8, 2019, the contents of all of which are incorporated herein by reference in their entirety.

TECHNICAL FIELD

The present invention relates to an aqueous coating material composition which is excellent in corrosion resistance, water resistance, processability, and film residue resistance, and is particularly suitable for a can lid.

BACKGROUND ART

As a coating for can inner surface, various coating compositions such as epoxy-based, polyvinyl chloride-based, and polyester-based coating compositions have been used from the viewpoint of coating film performance such as corrosion resistance and coating workability.

In particular, a coating composition containing an epoxy resin produced by using a raw material containing bisphenol A (BPA) or the like as a base resin has been widely and generally used.

However, from the viewpoint of environmental impact, a coating composition for can inner surface that is free of a raw material containing BPA (including a raw material that can contain a residual level of BPA) is desired. For example, a coating composition or the like containing a vinyl-based or acrylic-based resin described in Patent Literatures 1, 2 and 3 as a base resin is disclosed.

In recent years, laws and regulations that extend the range of regulated substances to styrene, formaldehyde, or isocyanate, as well as BPA are being enacted, especially in Europe and the United States, and the regulations are being strengthened.

In the current situation where the number of regulated substances is increasing and choices of raw materials that can be used in the coating composition are limited, a polyolefin resin is one of the promising resins as the base resin for the coating composition for can inner surface.

Further, as for a coating for can inner surface, an aqueous coating is being developed from the viewpoint of reducing an organic solvent.

As a coating composition for can inner surface applications or the like, which contains a polyolefin resin as a base resin, Patent Literature 4 discloses a coating composition containing, as constituent components, an aqueous dispersion liquid containing a polyolefin and a stabilizing solvent composition containing an alcohol.

CITATION LIST

Patent Literature

Patent Literature 1: JP 2005-120306 A
Patent Literature 2: JP 2005-179491 A
Patent Literature 3: JP 2016-113561 A
Patent Literature 4: JP 2016-501291 A

SUMMARY OF INVENTION

Technical Problem

However, although the coating composition described in Patent Literature 4 is excellent in storage stability, the corrosion resistance, processability, and water resistance of the obtained coating film may be insufficient. In addition, when the coating composition is applied to can lid applications for coating the lid portion of a can, the film residue resistance may be insufficient.

An object of the present invention is to provide an aqueous coating material composition suitable for can inner surface applications, which is excellent in corrosion resistance, water resistance and processability, and also excellent in film residue resistance when applied to can lid applications, without using raw materials containing legally regulated substances such as bisphenol A.

Solution to Problem

As a result of diligent studies to solve the above problems, the present inventors have found that in the case of an aqueous coating material composition containing a polyolefin resin aqueous dispersion (A) containing a polypropylene (a1), a crosslinking agent (B) having a functional group that reacts with a carboxyl group, and a polyester resin aqueous dispersion (C) in a specific resin acid value range, the above problems can be solved. Thus, the present invention has been completed.

That is, the present invention relates to the following contents.

1. An aqueous coating material composition, containing: a polyolefin resin aqueous dispersion (A) containing a polypropylene (a1); a crosslinking agent (B) having a functional group that reacts with a carboxyl group; and a polyester resin aqueous dispersion (C) having a resin acid value of 3 mgKOH/g to 100 mgKOH/g, in which
   with respect to a total solid content of the polyolefin resin aqueous dispersion (A),
   a solid content of the crosslinking agent (B) is 0.1 mass % to 20 mass %, and
   a solid content of the polyester resin aqueous dispersion (C) is 0.5 mass % to 30 mass %.

2. The aqueous coating material composition according to 1, in which a content of the polypropylene (a1) is 40 mass % or more with respect to the total solid content of the polyolefin resin aqueous dispersion (A).

3. A coated metal can, including a cured coating film formed by the aqueous coating material composition according to 1 or 2 on at least a part of a can body.

Advantageous Effects of Invention

Since the aqueous coating material composition of the present invention contains, as a base resin, the polyolefin containing a polypropylene, the aqueous coating material composition is excellent in corrosion resistance and processability. In addition, since the aqueous coating material composition of the present invention also contains the crosslinking agent having a functional group that reacts with a carboxyl group, the obtained coating film is also excellent in coating film performance such as water resistance.

Further, since the aqueous coating material composition of the present invention also contains a polyester resin in a specific resin acid value range, the aqueous coating material composition is also excellent in film residue resistance and processability, which are important performances required for can lid applications.

As described above, according to the present invention, it is possible to provide an aqueous coating material composition which is suitable for can inner surface, particularly in can lid applications, and is capable of obtaining a coating film excellent in corrosion resistance, water resistance, processability and film residue resistance.

DESCRIPTION OF EMBODIMENTS

The present invention relates to an aqueous coating material composition (hereinafter, may be abbreviated as the present coating material) contains: a polyolefin resin aqueous dispersion (A) containing a polypropylene (a1); a crosslinking agent (B) having a functional group that reacts with a carboxyl group; and a polyester resin aqueous dispersion (C) having a resin acid value of 3 mgKOH/g to 100 mgKOH/g, in which with respect to a total solid content of the polyolefin resin aqueous dispersion (A), a solid content of the crosslinking agent (B) is 0.1 mass % to 20 mass %, and a solid content of the polyester resin aqueous dispersion (C) is 0.5 mass % to 30 mass %.

Hereinafter, the contents according to an embodiment of the present invention will be described in detail. In the present description, the ratio based on "mass" (percentage, part, etc.) is the same as the ratio based on "weight" (percentage, part, etc.).

<Aqueous Coating Material Composition>
[Polyolefin Resin Aqueous Dispersion (A)]

The polyolefin resin aqueous dispersion (A) in the aqueous coating material composition according to the embodiment of the present invention is a dispersion liquid in which the polyolefin resin is dispersed in a medium containing water as a main component.

In the present coating material, the polypropylene (a1) is contained as an essential component of the polyolefin resin aqueous dispersion (A).

From the viewpoint of corrosion resistance, the solid content of the polypropylene (a1) is preferably 40 mass % or more, and more preferably 50 mass % or more, with respect to the total solid content of the polyolefin resin aqueous dispersion (A).

In the present coating material, the polyolefin resin aqueous dispersion (A) may contain a polyolefin resin (a2) other than the polypropylene (a1), in addition to the polypropylene (a1), which is an essential component.

The polyolefin resin (a2) is not particularly limited, and examples thereof include: homopolymers and copolymers (including elastomers) of one or more α-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as represented by polyethylene, poly-1-butene, poly-3-methyl-1-butene, poly-3-methyl-1-pentene, poly-4-methyl-1-pentene, an ethylene-propylene copolymer, an ethylene-1-butene copolymer, and a propylene-1-butene copolymer; copolymers (including elastomers) of one α-olefin having conjugated or unconjugated diene, which can be represented by an ethylene-butadiene copolymer and an ethylene-ethylidene norbornene copolymer; polyolefins such as copolymers (including elastomers) of two or more α-olefins having conjugated or unconjugated diene, which can be represented by an ethylene-propylene-butadiene copolymer, an ethylene-propylene-dicyclopentadiene copolymer, an ethylene-propylene-1,5-hexadiene copolymer and an ethylene-propylene-ethylidene norbornene copolymer; and ethylene-vinyl compound copolymers such as an ethylene-vinyl acetate copolymer, an ethylene-vinyl alcohol copolymer, an ethylene-vinyl chloride copolymer, an ethylene-acrylic acid copolymer, an ethylene-methacrylic acid copolymer, and an ethylene-(meth)acrylate copolymer.

The polyolefin resin (a2) may have a functional group such as a hydroxy group, an amino group, an aldehyde group, an epoxy group, an ethoxy group, a carboxyl group, an ester group or an anhydride group, or two or more of these functional groups. The polyolefin resin (a2) may be used alone or in combination of two or more thereof.

In the present description, "(meth)acrylate" means "acrylate or methacrylate".

The polyolefin resin aqueous dispersion (A) may also contain a stabilizer from the viewpoint of stability (for example, promotion of the formation of the aqueous dispersion).

Examples of the stabilizer include a surfactant and a polymer. The stabilizer may be used alone or in combination of two or more thereof.

Examples of the surfactant include an anionic surfactant, a cationic surfactant, and a nonionic surfactant.

Examples of the anionic surfactant include a sulfonate, a carboxylate, and a phosphate.

Examples of the cationic surfactant include a quaternary amine salt.

Examples of the nonionic surfactant include a polymer containing a nonionic group such as a polyoxyalkylene, and a silicone surfactant.

As the surfactant, a reactive surfactant having reactivity with the polyolefin resin can also be used.

Examples of the polymer include a polar polymer having a polar group.

Examples of the polar polymer include those based on resins such as an acrylic resin, a polyester resin, an epoxy resin, a polyamide resin, an acrylic modified polyester resin, and an acrylic modified epoxy resin.

As the polar polymer, a polyolefin resin having a polar group can also be used.

Examples of the functional group having polarity include a hydroxy group, an amino group, an aldehyde group, an epoxy group, an ethoxy group, a carboxyl group, an ester group or an anhydride group.

Further, as the stabilizer, for example, a long-chain fatty acid having 12 to 60 carbon atoms, a fatty acid salt, a fatty acid alkyl ester, and an ethylene-acrylic acid resin can be used.

In the case of using the stabilizer, the solid content of the stabilizer is, depending on the kind of the stabilizer, from the viewpoint of storage stability, preferably in the range of 5 mass % to 35 mass %, and particularly preferably in the range of 10 mass % to 30 mass % with respect to the total solid content of the polyolefin resin aqueous dispersion (A).

A basic compound may be added to the polyolefin resin aqueous dispersion (A) as a neutralizer, if necessary.

Examples of the basic compound include a hydroxide, a carbonate, and an amine.

Examples of the hydroxide include ammonium hydroxide, potassium hydroxide, lithium hydroxide, and sodium hydroxide.

Examples of the carbonate include sodium carbonate, sodium hydrogen carbonate, potassium carbonate, and calcium carbonate.

Examples of the amine include monoethanolamine, diethanolamine, triethanolamine, ammonia, monomethylamine, dimethylamine, trimethylamine, 2-amino-2-methyl-1-propanol, triisopropanolamine, diisopropanolamine, N,N-dimethylethanolamine, mono-n-propylamine, dimethyl-n-propylamine, N-methanolamine, N-aminoethylethanolamine, N-methyldiethanolamine, monoisopropanolamine, N,N-dimethylpropanolamine, 2-amino-2-methyl-1-propanol, tris(hydroxymethyl)-aminomethane, N,N,N',N'-tetrakis(2-hydroxylpropyl)ethylenediamine, 1,2-diaminopropane, 2-amino-2-hydroxymethyl-1,3-propanediol, and N,N'-ethylenebis[bis(2-hydroxypropyl)amine]toluene-p-sulfonate. The basic compound is preferably an amine from the viewpoint of water resistance.

The polyolefin resin aqueous dispersion (A) can be produced by a common method. Specifically, the polyolefin resin aqueous dispersion (A) can be produced by, for example, adding the polypropylene (a1), the polyolefin resin (a2) if necessary, water, and a stabilizer and a neutralizer (basic compound) if necessary, and performing melt-kneading.

Examples of a specific production procedure include, in the presence of water and one or more neutralizers, melting and mixing the polypropylene (a1), the polyolefin resin (a2) if necessary, and one or more stabilizers if necessary to form a emulsified mixture. Then, the emulsified mixture is brought into contact with further diluted water while removing heat if necessary to form particles dispersed in the water, thereby forming the aqueous dispersion.

The average particle size of the solid content of the polyolefin resin aqueous dispersion (A) is preferably in the range of 100 nm to 1000 nm, particularly preferably in the range of 110 nm to 900 nm, and still particularly preferably in the range of 120 nm to 800 nm from the viewpoint of coating workability.

The average particle size can be measured with a particle size measuring device, for example, Coulter (registered trademark) N4MD (trade name, manufactured by Beckman Coulter).

The solid content (total solid content) of the polyolefin resin aqueous dispersion (A) is preferably 25 mass % or more, and more preferably 35 mass % or more from the viewpoint of a high solid content. In addition, the solid content (total solid content) of the polyolefin resin aqueous dispersion (A) is preferably 65 mass % or less, and more preferably 55 mass % or less from the viewpoint of productivity.

[Crosslinking Agent (B)]

The crosslinking agent (B) is a compound having a functional group that reacts with a carboxyl group. The crosslinking agent (B) usually has, in the molecule, two or more functional groups that react with a carboxyl group.

When the crosslinking agent (B) is contained, it is possible to enhance the curability of the aqueous coating material composition according to the embodiment of the present invention, and to improve the coating film performance such as corrosion resistance and water resistance of the obtained coating film, particularly water resistance.

Examples of the functional group that reacts with a carboxyl group include a hydroxyalkylamide group, an oxazoline group, an aziridine group, an imide group (particularly a carbodiimide group), an epoxy group, a hydroxy group, and a methylol group.

Among the above functional groups, a hydroxyalkylamide group is preferred from the viewpoint of storage stability.

Specific examples of the crosslinking agent (B) include a hydroxyalkylamide-based crosslinking agent, an oxazoline-based crosslinking agent, an aziridine-based crosslinking agent, an imide-based crosslinking agent (particularly, a carbodiimide group-containing crosslinking agent), an epoxy-based crosslinking agent, and a hydroxy group-containing crosslinking agent.

Examples of the hydroxyalkylamide-based crosslinking agent include bis(N,N'-dihydroxyethyl) adipamide. Specifically, PRIMID (registered trademark, trade name of a crosslinking agent resin) such as PRIMID (registered trademark) XL-522 and PRIMID (registered trademark) SF-4510, which are commercially available products from Swiss EMS-GRILTECH, can be used.

Examples of the oxazoline-based crosslinking agent include components containing a vinyl-based monomer having an oxazoline group, such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. Examples of the component containing a vinyl-based monomer having an oxazoline group include a homopolymer of the vinyl-based monomer having an oxazoline group, a copolymer combining a plurality of vinyl-based monomers having an oxazoline group, or a vinyl resin or acrylic resin obtained by copolymerizing the vinyl-based monomer having an oxazoline group with another monomer. Examples of the commercially available product thereof include EPOCROS WS-300, WS-500, WS-700, EPOCROS K-2010, K-2020, K-2030 (EPOCROS is a registered trademark) manufactured by NIPPON SHOKUBAI Co., Ltd.

Examples of the aziridine-based crosslinking agent include glycerol-tris(1-aziridinylpropionate), glycerol-tris[2-methyl-(1-aziridinyl)] propionate, glycerol-tris[2-ethyl-(1-aziridinyl)] propionate, glycerol-tris[2-butyl-(1-aziridinyl)] propionate, glycerol-tris[2-propyl-(1-aziridinyl)] propionate, glycerol-tris[2-pentyl-(1-aziridinyl)]propionate, glycerol-tris[2-hexyl-(1-aziridinyl)] propionate, glycerol-tris[2,3-dimethyl-(1-aziridinyl)] propionate, glycerol-tris[2,3-diethyl-(1-aziridinyl)]propionate, glycerol-tris[2,3-dibutyl-(1-aziridinyl)]propionate), glycerol-tris[2,3-dipropyl-(1-aziridinyl)] propionate, glycerol-tris[2,3-dipentyl-(1-aziridinyl)]propionate, glycerol-tris[2,3-dihexyl-(1-aziridinyl)]propionate, trimethylolpropane-tris(1-aziridinylpropionate), trimethylolpropane-tris[2-methyl-(1-aziridinyl)] propionate, trimethylolpropane-tris[2-ethyl-(1-aziridinyl)]propionate, trimethylolpropane-tris[2-butyl-(1-aziridinyl)] propionate, trimethylolpropane-tris[2-propyl-(1-aziridinyl)] propionate, trimethylolpropane-tris[2-pentyl-(1-aziridinyl)] propionate, trimethylolpropane-tris[2-hexyl-(1-aziridinyl)] propionate, trimethylolpropane-tris[2,3-dimethyl-(1-aziridinyl)] propionate, trimethylolpropane-tris[2,3-diethyl-(1-aziridinyl)] propionate, trimethylolpropane-tris[2,3-dibutyl-(I-aziridinyl)] propionate), trimethylolpropane-tris[2,3-dipropyl-(1-aziridinyl)] propionate, trimethylolpropane-tris[2,3-dipentyl-(1-aziridinyl)] propionate, trimethylolpropane-tris[2,3-dihexyl-(1-aziridinyl)] propionate, tetramethylolmethane-tris(1-aziridinylpropionate), tetramethylolmethane-tris[2-methyl-(1-aziridinyl)] propionate, tetramethylolmethane-tris[2-ethyl-(1-aziridinyl)] propionate, tetramethylolmethane-tris[2-butyl-(1-aziridinyl)] propionate, tetramethylolmethane-tris[2-propyl-(1-aziridinyl)] propionate, tetramethylolmethane-tris[2-pentyl-(1-aziridinyl)] propionate, tetramethylolmethane-tris[2-hexyl-(1-aziridinyl)] propionate, tetramethylolmethane-tris[2,3-dimethyl-(1-aziridinyl)] propionate, tetramethylolmethane-tris[2,3-diethyl-(1-aziridinyl)] propionate, tetramethylolmethane-tris[2,3-dibutyl-(1-aziridinyl)] propionate, tetramethylolmethane-tris[2,3-dipropyl-(1-aziridinyl)] propionate, tetramethylolmethane-tris[2,3-dipentyl-(1-aziridinyl)] propionate, tetramethylolmethane-tris[2,3-dihexyl-(1-aziridinyl)] propionate, pentaerythritol-tetra(1-aziridinylpropionate), pentaerythritol-tetra[2-methyl-(1-aziridinyl)]propionate, pentaerythritol-tetra[2-ethyl-(I-aziridinyl)]propionate, pentaerythritol-tetra[2-butyl-(1-aziridinyl)] propionate, pentaerythritol-tetra[2-propyl-(1-aziridinyl)] propionate, pentaerythritol-tetra[2-pentyl-(1-aziridinyl)] propionate, pentaerythritol-tetra[2-hexyl-(1- aziridinyl)] propionate, pentaerythritol-tetra[2,3-dimethyl-(1-aziridinyl)] propionate, pentaerythritol-tetra[2,3-diethyl-(1-aziridinyl)] propionate, pentaerythritol-tetra[2,3-dibutyl-(1-aziridinyl)] propionate, pentaerythritol-tetra[2,3-dipropyl-(1-aziridinyl)] propionate, pentaerythritol-tetra[2,3-dipentyl-(1-aziridinyl)] propionate, pentaerythritol-tetra[2,3-dihexyl-(1-aziridinyl)] propionate, tetraaziridinyl metaxylylenediamine, tetraaziridinyl methylparaxylene diamine, tetramethylpropanetetraaziridinyl propionate, neopentyl glycol (β-aziridinylpropionate), 4,4'-isopropyridene diphenol di(p-aziridinylpropionate), 4,4'-methylenediphenol di(O-aziridinylpropionate), and 4,4'-bis(ethyleneiminocarbonylamino) diphenylmethane.

Examples of the imide-based crosslinking agent (particularly, a carbodiimide group-containing crosslinking agent) include carbodiimide derivatives such as 1,3-diisopropyl-carbodiimide (i.e., N,N'-diisopropylcarbodiimide), N,N-dicyclohexylcarbodiimide, N-ethyl-N'-(3-dimethylaminopropyl)-carbodiimide, or a hydrochloride thereof.

As a commercially available product of the crosslinking agent having a carbodiimide group, for example, CARBODILITE (trade name, registered trademark) manufactured by Nisshinbo Chemical Inc. can be used. Examples of CARBODILITE include water-soluble types "V-02", "V-02-L2", "SV-02", "V-04", "V-10", "SW-12G", etc. (all trade names), and emulsion types "E-02", "E-03A", "E-05", etc. (all trade names).

As the epoxy-based crosslinking agent, any known epoxy resins (compounds) having at least two epoxy groups (glycidyl groups) in the molecule can be used without particular limitation. Among the above epoxy resins (compounds), an alicyclic epoxy compound can be particularly preferably used.

As the alicyclic epoxy compound, a commercially available product can be used, and specific examples thereof include Denacol (trade name, registered trademark) manufactured by Nagase ChemteX Corporation.

Examples of Denacol include bifunctional types "EX-211", "EX-212", "EX-252", "EX-810", "EX-811", "EX-850", "EX-851", "EX-821", "EX-830", "EX-832", "EX-841", "EX-861", "EX-911", "EX-941", "EX-920", "EX-931", etc. (all trade names), and multifunctional types "EX-313", "EX-314", "EX-321", "EX-411", "EX-421", "EX-512", "EX-521", "EX-612", "EX-614", "EX-614B", etc. (all trade names).

Examples of the hydroxy group-containing crosslinking agent include bifunctional or higher, preferably trifunctional or higher polyhydric alcohols, such as: aliphatic alcohols such as glycerin, ethylene glycol pentaerythritol, pentaglycerol, and polyvinyl alcohol; alicyclic alcohols such as fluorochlorositol, quercitol, and inositol; aromatic alcohols such as tris(hydroxy)benzene; sugars such as starch, D-erythrose, L-arabinose, D-mannose, D-galactose, D-fructose, L-rhamnose, saccharose, maltose, and lactose; and sugar alcohols such as erythritol, L-arabitol, adonitol, and xylitol.

The crosslinking agent (B) may be used alone or in combination of two or more thereof.

The solid content of the crosslinking agent (B) is, depending on the kind of the crosslinking agent, from the viewpoint of improving the water resistance and the corrosion resistance, 0.1 mass % to 20 mass % with respect to the total solid content of the polyolefin resin aqueous dispersion (A). The solid content of the crosslinking agent (B) with respect to the total solid content of the polyolefin resin aqueous dispersion (A) is preferably 0.2 mass % or more, and more preferably 0.5 mass % or more. In addition, the solid content of the crosslinking agent (B) with respect to the total solid content of the polyolefin resin aqueous dispersion (A) is preferably 15 mass % or less, and more preferably 10 mass % or less.

[Polyester Resin Aqueous Dispersion (C)]

The aqueous coating material composition according to the embodiment of the present invention contains a polyester resin aqueous dispersion (C). By virtue of the polyester resin aqueous dispersion (C), physical properties such as flexibility of the coating film obtained by the aqueous coating material composition according to the embodiment of the present invention can be improved, and in particular, film residue resistance and processability, which are important performances for can lid applications, can be improved. In the present description, the film residue refers to a problem that a coating film piece remains on the can lid opening tab when the can lid is opened.

The resin acid value of the polyester resin contained in the polyester resin aqueous dispersion (C) is 3 mgKOH/g to 100 mgKOH/g, from the viewpoints of the water dispersion stability of the coating composition and the water resistance of the obtained coating film. The above resin acid value is preferably 4 mgKOH/g or more, and more preferably 5 mgKOH/g or more. In addition, the above resin acid value is preferably 95 mgKOH/g or less, more preferably 90 mgKOH/g or less, and still more preferably 50 mgKOH/g or less.

When the resin acid value is 3 mgKOH/g or more, the stability of the polyester resin aqueous dispersion (C) and the obtained aqueous coating material composition is improved. In addition, when the resin acid value is 100 mgKOH/g or less, the water resistance of the obtained coating film is improved.

The polyester resin contained in the polyester resin aqueous dispersion (C) may be any of, for example, an oil-free polyester resin, an oil-modified alkyd resin, and a modified product of these resins, such as a urethane-modified polyester resin and a urethane-modified alkyd resin. Among these polyester resins, an oil-free polyester resin can be preferably used.

The oil-free polyester resin is generally an ester of a polybasic acid and a polyhydric alcohol. As the polybasic acid component, for example, dibasic acids selected from phthalic anhydride, isophthalic acid, terephthalic acid, tetrahydrophthalic anhydride, hexahydrophthalic anhydride, hexahydroterephthalic acid, succinic acid, fumaric acid, adipic acid, sebacic acid, dimer acid, maleic anhydride, and 1,4-cyclohexanedicarboxylic acid can be used. As the polybasic acid component, a trivalent or higher polybasic acid, such as trimellitic anhydride, methylcyclohexene tricarboxylic acid, pyromellitic anhydride, and ethylene glycol bisanhydrotrimellitate, can also be used in combination, if necessary.

When a sulfonic acid group is to be introduced into the oil-free polyester resin, a sulfonic acid salt group-containing polybasic acid such as sodium 5-sulfoisophthalate can also be used in combination.

As an acid component other than the polybasic acid component, monobasic acids such as benzoic acid, crotonic acid, and p-tert-butylbenzoic acid can also be used in combination, if necessary. These acid components may be used alone or in combination of two or more thereof.

As the polyhydric alcohol component, for example, dihydric alcohols such as ethylene glycol, diethylene glycol, 1,2-propylene glycol, 1,3-propanediol, 1,4-butanediol, neopentyl glycol, 3-methylpentanediol, 1,4-hexanediol, 1,6-hexanediol, 2-methyl-1,3-propanediol, 2-ethyl-2-butyl-1,3-propanediol, 1,4-dimethylolcyclohexane, and 1,4-cyclohexanedimethanol are mainly used. As the polyhydric alcohol component, trihydric alcohol or higher polyhydric alcohols, such as glycerin, trimethylolethane, trimethylolpropane, and pentaerythritol, can also be used in combination, if necessary. These polyhydric alcohols may be used alone or in combination of two or more thereof.

The esterification reaction of both components can be performed by a known method.

The oil-free polyester resin can be obtained by performing a transesterification reaction using an alkyl ester (for example, methyl ester or ethyl ester) of a polybasic acid instead of the polybasic acid in the above esterification reaction. The transesterification reaction of both components can be performed by a common method.

In the above oil-free polyester resin, it is preferable that an aromatic dicarboxylic acid accounts for 80 mol % to 100 mol % of the acid component from the viewpoints of retort resistance and content resistance.

The oil-modified alkyd resin is a resin obtained by further reacting an oil fatty acid in addition to the acid component and the alcohol component of the oil-free polyester resin by a common method.

Examples of the oil fatty acid include coconut oil fatty acid, soybean oil fatty acid, flaxseed oil fatty acid, safflower oil fatty acid, tall oil fatty acid, dehydrated castor oil fatty acid, and tung oil fatty acid.

The urethane-modified polyester resin is a resin obtained by reacting the above oil-free polyester resin with a polyisocyanate compound by a common method. The urethane-modified alkyd resin is a resin obtained by reacting an alkyd resin with a polyisocyanate compound by a common method.

Examples of the polyisocyanate compound for use in the production of the urethane-modified polyester resin and the urethane-modified alkyd resin include hexamethylene diisocyanate, isophorone diisocyanate, xylylene diisocyanate, tolylene diisocyanate, 4,4'-diphenylmethane diisocyanate, 4,4'-methylenebis(cyclohexyl isocyanate), and 2,4,6-triisocyanatotoluene.

The solid content of the polyester resin aqueous dispersion (C) is, depending on the kind of the polyester resin, from the viewpoint of improving particularly the film residue resistance and the processability, 0.5 mass % to 30 mass % with respect to the total solid content of the polyolefin resin aqueous dispersion (A). The solid content of the polyester resin aqueous dispersion (C) with respect to the total solid content of the polyolefin resin aqueous dispersion (A) is preferably 1.0 mass % or more, and more preferably 2.0 mass % or more. In addition, the solid content of the polyester resin aqueous dispersion (C) with respect to the total solid content of the polyolefin resin aqueous dispersion (A) is preferably mass % or less, and more preferably 20 mass % or less.

The polyester resin contained in the polyester resin aqueous dispersion (C) preferably has a glass transition temperature (hereinafter, may be abbreviated as "Tg") in the range of −20° C. to 100° C., and particularly preferably in the range of 0° C. to 80° C.

When the Tg of the polyester resin is 100° C. or lower, the processability is improved. In addition, when the Tg of the polyester resin is −20° C. or higher, the corrosion resistance and the water resistance of the obtained coating film are improved.

From the viewpoints of the corrosion resistance, the water resistance and the film residue resistance, the polyester resin contained in the polyester resin aqueous dispersion (C) preferably has a number average molecular weight in the range of 3,000 to 100,000, particularly preferably in the range of 5,000 to 50,000, and more preferably in the range of 10,000 to 30,000.

From the viewpoints of the hardness and the water resistance of the obtained coating film, the polyester resin contained in the polyester resin aqueous dispersion (C) preferably has a hydroxyl value of 0.5 mgKOH/g to 40 mgKOH/g, and particularly preferably 3 mgKOH/g to 20 mgKOH/g.

In the present description, Tg is measured by differential thermal analysis (DSC) using a differential scanning calorimeter. The number average molecular weight is measured by gel permeation chromatography (GPC) as described below using a standard polystyrene calibration curve.

The number average molecular weight is a value obtained by converting the retention time (retention capacity) measured by a gel permeation chromatograph ("HLC (registered trademark) 8120GPC" manufactured by Tosoh Corporation) using tetrahydrofuran as a solvent based on the number average molecular weight of polystyrene. The measurement can be performed using four columns "TSKgel G-4000HXL", "TSKgel G-3000HXL", "TSKgel G-2500HXL", and "TSKgel G-2000XL" (trade names, TSKgel is a registered trademark, all manufactured by Tosoh Corporation), in the following condition: mobile phase: tetrahydrofuran, measurement temperature: 40° C., flow rate: 1 mL/min, and detector: RI.

The aqueous coating material composition according to the embodiment of the present invention contains a medium containing water as a main component. From the viewpoint of the coating workability, the solid content concentration of the aqueous coating material composition according to the embodiment of the present invention is preferably in the range of 10 mass % to 50 mass %, particularly preferably in the range of 20 mass % to 40 mass %, and more preferably in the range of 25 mass % to 35 mass %.

The aqueous coating material composition according to the embodiment of the present invention can be prepared by appropriately mixing the above-mentioned contained components by a common method. Further, if necessary, known raw materials such as an organic solvent, a defoaming agent, a silane coupling agent, a surfactant, a lubricant, a wax, a viscosity modifier, and a pigment can be appropriately mixed and used in the aqueous coating material composition according to the embodiment of the present invention.

Examples of the above organic solvent that can be used in the present invention include: alkyl alcohols such as methanol, ethanol, n-propanol, isopropanol, n-butanol, sec-butanol, tert-butanol, isobutanol, amyl alcohol, n-hexanol, octanol, and 2-ethylhexyl alcohol; glycol ethers such as methyl cellosolve, ethyl cellosolve, propyl cellosolve, butyl cellosolve, hexyl cellosolve, methyl carbitol, ethyl carbitol, and butyl carbitol; or glycol ether esters such as methyl cellosolve acetate and ethyl cellosolve acetate; dioxane; dimethylformamide; tetrahydrofuran; methyl ethyl ketone; methyl isobutyl ketone; and diacetone alcohol. These organic solvents can be used in combination of two or more thereof.

Examples of the above defoaming agent include acrylic, vinyl ether-based, or dimethylpolysiloxane-based compounds. These defoaming agents can be used in combination of two or more thereof.

Examples of the above silane coupling agent include those having a vinyl group, those having an amino group, those having a methacrylic group, and those having an acrylic group as an organic functional group. These silane coupling agents can be used in combination of two or more thereof.

The aqueous coating material composition according to the embodiment of the present invention can be applied to various substrates. Examples of the substrate include untreated or surface-treated metal plates such as an aluminum plate, a steel plate, and a tin plate, metal plates obtained by coating these metal plates with an epoxy-based or vinyl-based primer, and cans obtained by processing these metal plates.

Examples of the can coated with the aqueous coating material composition according to the embodiment of the present invention include cans with various forms, such as a two-piece can consisting of two parts: a lid portion and a body portion integrated with a bottom portion, a three-piece can consisting of three parts: a lid portion, a bottom portion, and a body portion, and a bottle can. The aqueous coating material composition according to the embodiment of the present invention can be coated onto each portion of the above cans.

Because of being excellent in corrosion resistance, water resistance and processability, the coating film obtained from the aqueous coating material composition according to the embodiment of the present invention can be suitably used for coating the inner surface of a can such as a beverage can. Further, because of being particularly excellent in film residue resistance, the aqueous coating material composition according to the embodiment of the present invention undergoes repeated irregularities in the production process and can be particularly suitably used for coating a lid portion having an opening tab.

In addition, the aqueous coating material composition according to the embodiment of the present invention can also be used for repair coating of seams (joints) on the can inner surface, and coating of the outer surface or the tab of the can lid, and the like.

As a method of coating the substrate with the aqueous coating material composition according to the embodiment of the present invention, various known methods such as roll coater coating, spray coating, immersion coating, and electrodeposition coating can be applied. Among these, roll coater coating or spray coating is preferred.

The coating amount may be appropriately selected depending on the application, and is usually preferably about 10 to 200 mg/100 cm$^2$, and particularly preferably about 20 to 150 mg/100 cm$^2$ in terms of the weight of the cured coating film. As drying conditions for the coating film coated, usually, it is preferable that the drying time is 10 seconds to 30 minutes under the condition that the peak metal temperature is 120° C. to 300° C., and it is particularly preferable that the drying time is within the range of 15 seconds to 10 minutes under a peak metal temperature of 200° C. to 280° C.

[Coated Metal Can]

A coated metal can according to the embodiment of the present invention includes a cured coating film formed by the above aqueous coating material composition on at least a part of a can body.

As the aqueous coating material composition for use in the coated metal can, the aqueous coating material composition in the above <Aqueous coating material composition> can be used, and the preferred embodiment is also similar. In addition, the above coated metal can, the coating method of the aqueous coating material composition is not particularly limited, and the coating method of the aqueous coating material composition in the above <Aqueous coating material composition> can be appropriately adopted. Examples of the can body include cans having various forms, similar to those mentioned in the above <Aqueous coating material composition>.

EXAMPLES

Hereinafter, the present invention will be described in more detail with reference to Examples. Here, when simply referred to as "parts" and "%", the expressions mean "parts by mass" and "mass %", respectively.

Production Example 1: Production of Polyolefin Resin Aqueous Dispersion (A1)

A polypropylene (6043 (trade name), manufactured by Braskem America) added at 212 g/min, PRIMACOR (registered trademark) 5980i (trade name, an ethylene-acrylic acid copolymer, manufactured by Dow Chemical) added at 68 g/min, and LICOCENE (registered trademark) 6452 (trade name, a propylene-maleic anhydride graft copolymer, manufactured by Clariant) added at 23 g/min were supplied to a twin-screw extruder heated to 160° C. To the extruder, deionized water was supplied at 70 g/min and dimethylethanolamine was supplied at 30 g/min, and diluted water was supplied to two positions in a dilution compartment of the extruder to obtain a final solid content of 47%. The extruder temperature profile was reduced to less than 100° C. at the end of the extruder. Extrusion was performed at 1200 rpm while adjusting the back pressure to obtain a polyolefin resin aqueous dispersion (A1) having a solid content of 47 mass %.

The polyolefin resin aqueous dispersion (A1) has a solid content of polypropylene of 70 mass % based on the total solid content.

Production Example 2: Production of Polyolefin Resin Aqueous Dispersion (A2)

A polypropylene (6043 (trade name), manufactured by Braskem America) added at 150 g/min, PRIMACOR (registered trademark) 5980i (trade name, an ethylene-acrylic acid copolymer, manufactured by Dow Chemical) added at 108 g/min, and LICOCENE (registered trademark) 6452 (trade name, a propylene-maleic anhydride graft copolymer, manufactured by Clariant) added at 45 g/min were supplied to a twin-screw extruder heated to 160° C. To the extruder, deionized water was supplied at 70 g/min and dimethylethanolamine at 30 g/min, and diluted water was supplied to two positions in a dilution compartment of the extruder to obtain a final solid content of 47%. The extruder temperature profile was reduced to less than 100° C. at the end of the extruder. Extrusion was performed at 1200 rpm while adjusting the back pressure to obtain a polyolefin resin aqueous dispersion (A2) having a solid content of 47 mass %.

The polyolefin resin aqueous dispersion (A2) has a solid content of polypropylene of 49.5 mass % based on the total solid content.

Production Example 3: Production of Polyester Resin Aqueous Dispersion (C1)

(Synthesis of Polyester Resin (c1))

To a stainless steel reactor equipped with a stirrer, a condenser, and a thermometer, terephthalic acid, isophthalic acid, and sodium 5-sulfoisophthalate as acid components, ethylene glycol and neopentyl glycol as alcohol components, and basic aluminum acetate (hydroxyaluminum diacetate, manufactured by Sigma-Aldrich) and Irganox 1222 (phosphorus compound, manufactured by BASF) as polymerization catalysts were fed to have mol % of each component described in Table 1, and the esterification reaction was performed at 150° C. to 220° C. under a nitrogen atmosphere. Next, the pressure was gradually reduced while heating to 260° C. to reduce the pressure to 13.3 Pa over 60 minutes, and polymerization was performed at this temperature and under reduced pressure conditions for 1 hour, thereby obtaining a polyester resin (c1). Table 1 shows the composition and characteristic values of the obtained polyester resin (c1).

(Production of Polyester Resin Aqueous Dispersion (C1))

To a reaction can equipped with a stirrer, a condenser, and a thermometer, 100 parts by mass (solid content) of the polyester resin (c1), 120 parts by mass of methyl ethyl ketone, parts by mass of 2-propanol and 10 parts by mass of water were fed, and the temperature was raised to 70° C. with stirring at 50 rpm. The resin was completely dissolved by stirring for another 3 hours.

Then, 300 parts by mass of 70° C. warm water was added thereto to prepare an aqueous dispersion. Further, the temperature inside the container was gradually raised, and the organic solvent was distilled off. The temperature inside the reaction can was cooled to room temperature, and filtration was further performed with a 200-mesh filter, thereby obtaining a polyester resin aqueous dispersion (C1).

Production Example 4: Production of Polyester Resin Aqueous Dispersions (C2) and (C3)

In the same manner as in the synthesis of the polyester resin (c1), polyester resins (c2) and (c3) were synthesized with the compositions shown in Table 1. Table 1 also shows the characteristic values of the obtained polyester resins. Further, polyester resin aqueous dispersions (C2) and (C3) were obtained in the same manner as in the production of the polyester resin aqueous dispersion (C1).

Production Example 5: Production of Polyester Resin Aqueous Dispersions (C4)

(Synthesis of Polyester Resin (c4))

To a stainless steel reactor equipped with a stirrer, a condenser, and a thermometer, terephthalic acid, isophthalic acid, and trimellitic acid as acid components, ethylene glycol and neopentyl glycol as alcohol components, and basic aluminum acetate and Irganox 1222, similar to those used in Production Example 3, as polymerization catalysts were fed to have mol % of each component described in Table 1, and the esterification reaction was performed at 150° C. to 220° C. under a nitrogen atmosphere. Next, the pressure was gradually reduced while heating to 240° C. to reduce the pressure to 13.3 Pa over 60 minutes.

Further, the system was maintained at 220° C., the vacuum state was released with nitrogen gas, a predetermined amount of trimellitic anhydride and ethylene glycol bisanhydrotrimellitate were added under a nitrogen atmosphere, and stirring was performed for 30 minutes, thereby obtaining a polyester resin (c4). Table 1 shows the composition and characteristic values of the obtained polyester resin (c4).

(Production of Polyester Resin Aqueous Dispersion (C4))

To a reaction can equipped with a stirrer, a condenser, and a thermometer, 100 parts by mass (solid content) of the polyester resin (c4) and 120 parts by mass of methyl ethyl ketone were fed, and the temperature was raised to 70° C. with stirring at 50 rpm. The resin was completely dissolved by stirring for another 3 hours. Then, 30 parts by mass of 2-propanol, 25 parts by mass of triethylamine, and 300 parts by mass of warm water at 70° C. were added thereto to prepare an aqueous dispersion. Further, the temperature inside the container was gradually raised, and the organic solvent was distilled off. The temperature inside the reaction can was cooled to room temperature, and filtration was further performed with a 200-mesh filter, thereby obtaining a polyester resin aqueous dispersion (C4).

Production Example 6: Production of Polyester Resin Aqueous Dispersions (C5) to (C10)

In the same manner as in the synthesis of the polyester resin (c4), polyester resins (c5), (c6), (c7), (c8), (c9), and (c10) were synthesized with the compositions shown in Table 1. Table 1 also shows the characteristic values of the obtained polyester resins. Further, polyester resin aqueous dispersions (C5), (C6), (C7), (C8), (C9), and (C10) were obtained in the same manner as in the production of the polyester resin aqueous dispersion (C4).

TABLE 1

| Polyester resin aqueous dispersion (C) | | C1 | C2 | C3 | C4 | C5 | C6 | C7 | C8 | C9 | C10 |
|---|---|---|---|---|---|---|---|---|---|---|---|
| Polyester resin (c) | | c1 | c2 | c3 | c4 | c5 | c6 | c7 | c8 | c9 | c10 |
| Polybasic carboxylic acid component (mol %) | Terephthalic acid | 48 | 50 | — | 50 | 50 | 50 | 50 | 50 | 50 | 50 |
| | Isophthalic acid | 48 | — | 90 | 42 | 50 | 50 | 40 | 20 | 42 | 42 |
| | sodium 5-sulfoisophthalate | 4 | 6 | 7 | — | — | — | 10 | — | — | — |
| | 5-hydroxyisophthalic acid | — | — | — | — | — | — | — | 20 | — | — |
| | Adipic acid | — | 44 | — | — | — | — | — | — | — | — |
| | Trimellitic acid | — | — | — | 8 | — | — | — | 10 | 8 | 8 |
| | Pyromellitic acid | — | — | 3 | — | — | — | 10 | — | — | — |
| Additive acid component (mol %) | Trimellitic anhydride | — | — | — | 10 | 3 | 1 | 10 | 15 | 5 | 3 |
| | Ethylene glycol bisanhydrotrimellitate | — | — | — | 10 | — | — | 10 | — | 5 | 3 |
| Polyhydric alcohol component (mol %) | Ethylene glycol | 50 | 45 | 10 | 50 | 50 | 50 | 50 | 55 | 50 | 50 |
| | Diethylene glycol | — | — | 85 | — | — | — | — | 45 | — | — |
| | Neopentyl glycol | 50 | — | 5 | 50 | 50 | 50 | 50 | — | 50 | 50 |
| | 1,4-butanediol | — | 53 | — | 5 | — | — | — | — | — | — |
| | Polytetramethylene ether glycol (molecular weight: 1300) | — | 2 | — | — | — | — | — | — | — | — |

TABLE 1-continued

| | Polyester resin aqueous dispersion (C) | C1 | C2 | C3 | C4 | C5 | C6 | C7 | C8 | C9 | C10 |
|---|---|---|---|---|---|---|---|---|---|---|---|
| | Polyester resin (c) | c1 | c2 | c3 | c4 | c5 | c6 | c7 | c8 | c9 | c10 |
| Catalyst (mol %) | Basic aluminum acetate | 0.02 | 0.02 | 0.1 | 0.02 | 0.02 | 0.02 | 0.02 | 0.02 | 0.02 | 0.02 |
| | Irganox 1222 | 0.04 | — | — | 0.04 | 0.04 | 0.04 | 0.04 | 0.04 | 0.04 | 0.04 |
| | Lithium acetate | — | 0.02 | — | — | — | — | — | — | — | — |
| Characteristic value | Acid value (mgKOH/g) | 9.7 | 15 | 18 | 94 | 6.0 | 2.5 | 120 | 117 | 50 | 38 |
| | Glass transition temperature (° C.) | 63 | −14 | 22 | 46 | 63 | 62 | 54 | 56 | 51 | 54 |

Example 1: Production of Aqueous Coating Material Composition No. 1

The raw materials shown in Table 2 were mixed at the composition ratio (mass solid content ratio) shown in Table 2, ethylene glycol monobutyl ether and hexylene glycol were added thereto to be 7 mass % and 2 mass % respectively while diluting with deionized water, and the pH was adjusted to 8.0 with dimethylethanolamine, thereby obtaining an aqueous coating material composition No. 1 having a solid content concentration of 30 mass %. The amount of ethylene glycol monobutyl ether or hexylene glycol added here is the amount (mass %) with respect to the total solid content of each coating composition in the table.

The value of the amount of each raw material in Tables 2 and 3 represents the mass ratio (mass solid content ratio) of the solid content of each raw material. Note 1 to Note 4 in Tables 2 and 3 are as follows.

(Note 1): PRIMID (registered trademark) XL-522: hydroxyalkylamide-based crosslinking agent, manufactured by EMS-GRILTECH (Note 2): EPOCROS (registered trademark) WS-700: oxazoline-based crosslinking agent, oxazoline group-containing polymer, manufactured by NIPPON SHOKUBAI Co., Ltd.

(Note 3): CARBODILITE (registered trademark) E-02: imide-based crosslinking agent, carbodiimide resin, manufactured by Nisshinbo Chemical Inc.

(Note 4): KBM-903: γ-aminopropyltrimethoxysilane, manufactured by Shin-Etsu Chemical Co., Ltd.

Examples 2 to 23 and Comparative Examples 1 to 7: Aqueous Coating Material Compositions No. 2 to No. 30

In the same manner as in Example 1, the raw materials shown in Tables 2 and 3 were mixed at the composition ratios (mass solid content ratios) shown in Tables 2 and 3 to produce respective aqueous coating material compositions No. 2 to No. 30. The aqueous coating material compositions No. 24 to No. 30 are Comparative Examples.

<Preparation of Test Coated Plate>

Each of the aqueous coating material composition obtained in the above Examples and Comparative Examples was coated onto an aluminum plate according to JIS A5182 and having a thickness of 0.26 mm with a roll coater such that the weight of the cured coating film was 90 to 100 mg/100 cm$^2$, and the obtained aluminum plate was baked by being passed through a conveyor-type hot air drying furnace, thereby obtaining a test coated plate. As the baking conditions, the peak metal temperature (PMT) was 250° C. and the passage time in the drying furnace was 20 seconds. Each test was carried out for each of the obtained test coated plates according to the following test method. In each test, the evaluation of A to B is within the practical range. The test results are shown in Tables 2 and 3.

<T-bend Bending Processability>

The test coated plate was cut to a length of 5 cm in the rolling direction and 4 cm in the vertical direction, and then the lower part was folded in half parallel to the short side. In a room at 20° C., two aluminum plates each having a thickness of 0.26 mm were sandwiched between bent portions of the test pieces of this test coated plate, and set in a special folding type DuPont impact tester. An iron weight having a flat contact surface and a weight of 1 kg was dropped from a height of 50 cm to give an impact to the bent portions, then a bent tip was energized at an applied voltage of 6.5 V for 6 seconds, and the current value (mA) of the bent tip having a width of 20 mm was measured and evaluated according to the following criteria.

A: the current value is less than 10 mA.
B. the current value is 10 mA or more and less than 40 mA.
C: the current value is 40 mA or more and less than 80 mA.
D: the current value is 80 mA or more.

In addition, an adhesion test was conducted by peeling a Cellotape (registered trademark, manufactured by Nichiban Co., Ltd.) in the processed portion, and evaluation was performed according to the following criteria.

A: the peeled area of the coating film is less than 10% of the whole.
B: the peeled area of the coating film is 10% or more and less than 20% of the whole.
C: the peeled area of the coating film is 20% or more and less than 40% of the whole.
D: the peeled area of the coating film is 40% or more of the whole.

<Water Resistance>

The test coated plate was immersed in water and processed at 100° C. for 30 minutes, and then the whitening state of the coating film was visually observed and evaluated according to the following criteria.

A: no whitening is observed.
B: partial whitening is slightly observed.
C: considerable whitening is observed.
D: significant whitening is observed.

<Corrosion Resistance>

The test coated plate was immersed in a mixed aqueous solution in which citric acid, malic acid, and sodium chloride were dissolved at 3% each, left at 40° C. for 2 weeks, and then the coated surface condition was visually observed and evaluated according to the following criteria.

A: no dulling or corrosion is observed.
B: there is dulling, but no corrosion is observed.
C: slight corrosion is observed.
D: considerable corrosion is observed.

<Film Residue Resistance>

The test coated plate was processed into a lid using a lid-making pressing machine to prepare a can lid having a coated surface on the inner surface side. The prepared can lid was immersed in 100° C. boiling water for 10 minutes, and then with the coated surface facing downward, the opening piece (tab) provided on the upper surface of the can lid was pulled upward to open the opening. The peeling width of the coating film from the opening edge of the opening was measured and evaluated according to the following criteria.
- A: the maximum peeling width of the coating film is less than 0.2 mm.
- B: the maximum peeling width of the coating film is 0.2 mm or more and less than 0.5 mm.
- C: the maximum peeling width of the coating film is 0.5 mm or more and less than 1.0 mm.
- D: the maximum peeling width of the coating film is 1.0 mm or more.

<Coating Material Stability>

Each aqueous coating material composition was allowed to stand at room temperature for 1 week, visually observed, and evaluated according to the following criteria.
- A: no precipitation is observed.
- B: almost no precipitation is observed.
- C: slight precipitation is observed.
- D: a considerable amount of precipitate is observed.

TABLE 2

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Aqueous coating material composition No. | | 1 | 2 | 3 | 4 | 5 | 6 | 7 | 8 | 9 | 10 | 11 | 12 | 13 | 14 |
| Polyolefin resin aqueous dispersion (A1) | | 100 | — | 100 | 100 | 100 | 100 | 100 | 100 | 100 | 100 | 100 | 100 | 100 | 100 |
| Polyolefin resin aqueous dispersion (A2) | | — | 100 | — | — | — | — | — | — | — | — | — | — | — | — |
| Polyester resin aqueous dispersion (C1) | | — | — | — | — | — | 10 | — | — | — | — | — | — | — | — |
| Polyester resin aqueous dispersion (C2) | | — | — | 10 | — | — | — | — | — | — | — | 2 | 20 | — | — |
| Polyester resin aqueous dispersion (C3) | | — | — | — | 10 | — | — | — | — | — | — | — | — | — | — |
| Polyester resin aqueous dispersion (C4) | | — | — | — | — | 10 | — | — | — | — | — | — | — | 2 | 20 |
| Polyester resin aqueous dispersion (C5) | | 10 | 10 | — | — | — | — | 0.5 | 2 | 20 | 30 | — | — | — | — |
| Crosslinking agent (B) | PRIMID XL-522 (note 1) | 5 | 5 | 5 | 5 | 5 | 3 | 5 | 5 | 5 | 5 | 5 | 5 | 5 | 5 |
| | EPOCROS WS-700 (note 2) | — | — | — | — | — | — | — | — | — | — | — | — | — | — |
| | CARBODILITE E-02 (note 3) | — | — | — | — | — | — | — | — | — | — | — | — | — | — |
| Performance test | T-bend Bending Processability: current value | A | A | A | A | A | A | B | B | A | A | B | A | B | A |
| | T-bend Bending Processability: adhesion | B | B | B | B | B | B | B | B | B | B | B | B | B | B |
| | Water resistance | A | A | B | A | B | A | A | A | B | B | B | B | B | B |
| | Corrosion resistance | A | A | B | A | B | A | A | A | B | B | B | B | B | B |
| | Film residue resistance | A | A | A | A | A | B | A | A | A | A | A | A | A | A |
| | Coating stability | A | A | A | A | A | A | A | A | A | A | A | A | A | A |

TABLE 3

| | | Example | | | | | | | | | Comparative Example | | | | | | |
|---|---|---|---|---|---|---|---|---|---|---|---|---|---|---|---|---|---|
| | | 15 | 16 | 17 | 18 | 19 | 20 | 21 | 22 | 23 | 2 | 3 | 4 | 5 | 6 | 7 | |
| Aqueous coating material composition No. | | 15 | 16 | 17 | 18 | 19 | 20 | 21 | 22 | 23 | 24 | 25 | 26 | 27 | 28 | 29 | 30 |
| Polyolefin resin aqueous dispersion (A1) | | 100 | 100 | 100 | 100 | 100 | 100 | 100 | 100 | 100 | 100 | 100 | 100 | 100 | — | 100 | 100 | 100 |
| Polyolefin resin aqueous dispersion (A2) | | — | — | — | — | — | — | — | — | — | — | — | — | — | — | — | — |
| Polyester resin aqueous dispersion (C5) | | 10 | 10 | 10 | 10 | 10 | 10 | 10 | — | — | — | — | — | 0.3 | 40 | 10 | 10 |
| Polyester resin aqueous dispersion (C6) | | — | — | — | — | — | — | — | — | — | 10 | — | — | — | — | — | — |
| Polyester resin aqueous dispersion (C7) | | — | — | — | — | — | — | — | — | — | — | 10 | — | — | — | — | — |
| Polyester resin aqueous dispersion (C8) | | — | — | — | — | — | — | — | — | — | — | — | 10 | — | — | — | — |
| Polyester resin aqueous dispersion (C9) | | — | — | — | — | — | — | — | 10 | — | — | — | — | — | — | — | — |
| Polyester resin aqueous dispersion (C10) | | — | — | — | — | — | — | — | — | 10 | — | — | — | — | — | — | — |
| Crosslinking agent (B) | PRIMID XL-522 (note 1) | 0.1 | 0.5 | 10 | 20 | — | — | 5 | 5 | 5 | 5 | 5 | 5 | 5 | 5 | 0.05 | 25 |
| | EPOCROS WS-700 (note 2) | — | — | — | — | 5 | — | — | — | — | — | — | — | — | — | — | — |
| | CARBODILITE E-02 (note 3) | — | — | — | — | — | 5 | — | — | — | — | — | — | — | — | — | — |
| Silane coupling agent KBM-903 (note 4) | | — | — | — | — | — | — | 1 | — | — | — | — | — | — | — | — | — |
| Performance test | T-bend Bending Processability: current value | B | B | A | A | A | A | A | A | A | A | A | A | B | A | D | B |
| | T-bend Bending Processability: adhesion | B | B | B | B | B | B | A | B | B | B | B | B | C | B | D | B |
| | Water resistance | B | B | A | B | A | A | A | A | A | C | D | D | A | D | D | D |
| | Corrosion resistance | B | A | A | A | A | A | A | A | A | C | D | D | A | D | B | D |
| | Film residue resistance | B | A | A | A | A | A | A | A | A | A | A | D | C | B | B | B |
| | Coating stability | A | A | A | A | A | A | A | A | A | D | A | A | A | A | A | A |

As a result of the performance test, the aqueous coating material composition according to the present invention was excellent in coating stability, corrosion resistance, water resistance and processability, and was also excellent in film residue resistance. In contrast, the coating film using the coating composition of Comparative Example could not exhibit the above effects.

Although the present invention has been described in detail with reference to specific embodiments, it will be apparent to those skilled in the art that various changes and modifications can be made without departing from the spirit and scope of the present invention. The present application is based on Japanese Patent Application No. 2019-000925 filed on Jan. 8, 2019, the contents of which are incorporated herein by reference.

INDUSTRIAL APPLICABILITY

According to the present invention, it is possible to provide an aqueous coating material composition excellent in corrosion resistance, water resistance and processability, and particularly excellent in film residue resistance. In addition, according to the present invention, it is possible to provide an aqueous coating material composition free of legally regulated substances such as bisphenol A. The aqueous coating material composition of the present invention is suitable for the can inner surface, and is particularly suitable for a can lid application.

The invention claimed is:

1. An aqueous coating material composition, comprising: a polyolefin resin aqueous dispersion (A) containing a polypropylene (a1); a crosslinking agent (B) having a functional group that reacts with a carboxyl group; and a polyester resin aqueous dispersion (C) having a resin acid value of 50 mgKOH/g to 100 mgKOH/g, wherein
with respect to a total solid content of the polyolefin resin aqueous dispersion (A),
a solid content of the crosslinking agent (B) is 0.1 mass % to 20 mass %, and
a solid content of the polyester resin aqueous dispersion (C) is 0.5 mass % to 30 mass %.

2. The aqueous coating material composition according to claim 1, wherein a content of the polypropylene (a1) is 40 mass % or more with respect to the total solid content of the polyolefin resin aqueous dispersion (A).

3. A coated metal can, comprising a cured coating film formed by the aqueous coating material composition according to claim 1 on at least a part of a can body.

4. A coated metal can, comprising a cured coating film formed by the aqueous coating material composition according to claim 2 on at least a part of a can body.

* * * * *